United States Patent
Wang et al.

(10) Patent No.: US 10,417,629 B2
(45) Date of Patent: Sep. 17, 2019

(54) ACCOUNT IDENTIFIER DIGITIZATION ABSTRACTION

(71) Applicant: Microsoft Technology Licensing, LLC, Redmond, WA (US)

(72) Inventors: Yuanji Wang, Kirkland, WA (US); Ashok Srinivasan, Woodinville, WA (US); Xuqing Zhang, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 477 days.

(21) Appl. No.: 15/256,063

(22) Filed: Sep. 2, 2016

(65) Prior Publication Data
US 2018/0068302 A1   Mar. 8, 2018

(51) Int. Cl.
G06Q 20/34 (2012.01)
G06Q 20/20 (2012.01)

(52) U.S. Cl.
CPC ......... G06Q 20/341 (2013.01); G06Q 20/208 (2013.01)

(58) Field of Classification Search
CPC ................. G06Q 20/341; G06Q 20/208
See application file for complete search history.

(56) References Cited

U.S. PATENT DOCUMENTS

| | | | |
|---|---|---|---|
| 7,503,504 B2* | 3/2009 | Mitra | G06K 19/0719 235/380 |
| 8,412,631 B2 | 4/2013 | Crofts et al. | |
| 9,218,624 B2 | 12/2015 | Moghadam | |
| 2008/0208758 A1* | 8/2008 | Spiker | G06F 21/83 705/70 |
| 2013/0097080 A1 | 4/2013 | Smets et al. | |
| 2013/0124348 A1 | 5/2013 | Lal et al. | |
| 2013/0204785 A1* | 8/2013 | Monk | G06Q 20/32 705/44 |
| 2013/0226812 A1 | 8/2013 | Landrok et al. | |
| 2013/0232083 A1 | 9/2013 | Smith et al. | |
| 2013/0254110 A1* | 9/2013 | Royyuru | G06Q 20/38 705/44 |

(Continued)

FOREIGN PATENT DOCUMENTS

CN     102324076 A     1/2012

OTHER PUBLICATIONS

Comviva, et al., "HCE Payments—The Future of Contactless Payments", Published on: Feb. 25, 2016 Available at: http://blog.mahindracomviva.com/hce-payments-the-future-of-contactless-payments/, 2 pages.

(Continued)

*Primary Examiner* — Nathan A Mitchell

(57) ABSTRACT

Described herein are various technologies pertaining to integrating account identifier (e.g., card provider(s)) into a digitization system, for example, without requiring changes to a client application on a user device (e.g., smart phone). An extensible account identifier abstraction system is provided that stores data according to a unified data model and is accessible to the user device via unified interface(s). The extensible abstraction system includes one or more plugin modules/provider relay plugin(s) that convert call(s) to the unified interface(s) and data stored according to the unified data model into provider-specific call(s) with data formatted according to a provider-specific schema.

17 Claims, 6 Drawing Sheets

(56) References Cited

U.S. PATENT DOCUMENTS

| | | | |
|---|---|---|---|
| 2013/0282502 A1 | 10/2013 | Jooste | |
| 2014/0052617 A1* | 2/2014 | Chawla | G06Q 20/12 705/39 |
| 2014/0074637 A1 | 3/2014 | Hammad | |
| 2014/0310113 A1 | 10/2014 | Sengupta et al. | |
| 2015/0081728 A1* | 3/2015 | Rosenberg | G06Q 10/0633 707/756 |
| 2015/0118958 A1* | 4/2015 | Jain | G06Q 20/204 455/41.1 |
| 2015/0134540 A1 | 5/2015 | Law et al. | |
| 2016/0092857 A1* | 3/2016 | Amos | G06Q 20/22 705/39 |
| 2016/0104156 A1* | 4/2016 | Lorberg | G06Q 20/401 705/44 |
| 2016/0217459 A1* | 7/2016 | Lindner | G06Q 20/385 |

OTHER PUBLICATIONS

"Advanced Mobile Payment", In White Paper of Atos, Oct. 2012, 16 pages.

"The New Mobile Payment Landscape", Published on: Jul. 2015 Available at: http://www.gsma.com/digitalcommerce/wp-content/uploads/2015/07/GSMA-The-New-Mobile-Payment-Landscape_WEB.pdf, 27 pages.

"The Mobile Money Revolution—Part 1: NFC Mobile Payments", Published on: May 2013 Available at: https://www.itu.int/dms_pub/itu-t/oth/23/01/T23010000200001PDFE.pdf, 20 pages.

Profis, Sharon, "Everything you need to know about NFC and mobile payments", Published on: Sep. 9, 2014 Available at: http://www.cnet.com/how-to/how-nfc-works-and-mobile-payments/, 6 pages.

* cited by examiner

ACCOUNT IDENTIFIER DIGITIZATION ABSTRACTION

BACKGROUND

Electronic processing of card transaction(s) (e.g., debit card(s), credit card(s), etc.) can be complex. Each provider (e.g., VISA, MasterCard, AMEX, Discover etc.) can have it's a network and issuing entity(ies) (e.g., banks) can have unique mechanism(s) for authorizing and providing credentials. Further, with the recent introduction of integrated circuit cards (e.g., chip cards) for credit cards, debit cards, and the like, additional processing step(s) can be required, depending upon requirements of the issuing entity.

EMV is a standard for interoperation of chip cards and point of sale ("POS") terminals for authenticating and performing credit and/or debit card transactions. EMV is a standard that enables higher security credit and/or debit card transactions than conventional magnetic strip credit and/or debit card transactions. The EMV standard enables issuer to allow digital devices such as mobile phones to perform in-person, near field communication (e.g., tap-to-pay) purchase transactions. Chip cards can include memory that storage data and can further include component(s) that can be programmed (e.g., to facilitate security) that can be read.

SUMMARY

Described herein is a system and method for an extensible account identifier digitization abstraction system. The system can facilitate transaction(s) between a user device (e.g., smart phone) using a client application (e.g., electronic wallet) and a provider (e.g., issuing entity). The system can facilitate management operation(s) (e.g., enroll, cancel, query, etc.) and transaction-related operation(s) (e.g., provision card profile, provision new transaction credentials, etc.) regarding an account identifier (e.g., credit card, chipcard, debit card, reward card, etc.).

In one example, the extensible account identifier digitization abstraction system and the user device communicate via a protocol for secure communications over the Internet. Further, in one example, during a transaction (e.g., card transaction), the user device and a point of sale system can communicate using near field communications ("NFC") (e.g., "tap to pay") in which the user device and the point of sale system are within a specified proximity of one another.

The extensible account identifier digitization abstraction system exposes unified interface(s) to the user device and further stores data according to a unified data model. By exposing unified interface(s) to the user device, as additional provider(s) are added to the extensible account identifier digitization abstraction system, in one example, programming of the application and/or the user device are not required. Instead, the extensible account identifier digitization abstraction system, using plugin module(s) and/or provider relay plugin(s), converts call(s) to the unified interface(s) and data stored according to the unified data model into provider-specific call(s) with data formatted according to a provider-specific schema (e.g., contract).

By allowing for additional provider(s) to be added to the system without requiring changes to the client application, user(s) can add additional account identifier(s) (e.g., card(s)) to the client application in a familiar manner. User frustration with adding account identifier(s) (e.g., card(s)) to the application (e.g., electronic wallet) can be minimized. Further, a rate of innovation can be fundamentally increased.

The extensible account identifier digitization abstraction system is extendable by adding additional provider(s) to be added using plugin module(s) and/or provider relay plugin(s). The plugin module(s) and/or the provider relay plugin(s) can be generated, for example, using a plugin factory and/or by offline generation according to a provider-specific contract and/or specification setting forth content, timing and format of communication(s).

The extensible account identifier digitization abstraction system comprises provider-agnostic components which provide common functionality shared across different providers. Provider-specific logic is encapsulated into plugins which expose the provider-specific logic to other components of the system, for example, via unified interface(s).

The extensible account identifier digitization abstraction system can include an authentication gateway component that authenticates the user device. The authentication gateway component can isolate external network traffic from other components of the system. The authentication gateway component can serve as a proxy or interface between the user device and a management coordinator component. In order to utilize the system, a particular user device uses a unique token which authenticates the particular user device to the authentication gateway component.

The management coordinator component utilizes a plugin module associated with the particular provider. The plugin module communicates with the particular provider via a provider relay plugin of a secure relay processor. The plugin module provides functionality to transfer information between the unified interface exposed by the management coordinator and the provider. The plugin module can implement a set of operation interface(s), for example, to convert a unified interface call to a call to the provider to facilitate a specific digitization request from the device. The plugin module contains the business knowledge to connect the system to the provider and includes the knowledge of converting information received from the provider to the unified data model.

The secure relay processor processes secure data such as credit card information including encryption and decryption. The secure relay processor can include one or more provider relay plugin(s) which each facilitate secure processing based, for example, on a contract (e.g., specification) of a particular provider. In one example, the secure relay process and the one or more provider relay plugin(s) operate in a well-protected environment to prevent secure data from being leaked and/or being the subject of attack.

The system can include an encryption/decryption module utilized by provider relay plugin(s). The encryption/decryption module can operate in a well-protected environment, as noted above. In one example, the encryption/decryption module comprises a hardware security module (HSM) which protects encryption/decryption keys and performs encryption/decryption algorithm(s).

Thus, in one example, the plugin module converts unified interface call(s) to provider-specific request(s), handles provider-specific notification(s)/response(s), converts provider-specific concept(s) to unified interface call(s). The provider relay plugin handles provider-specific encryption/decryption requirement(s) and converts them into a unified security schema (e.g., based on the unified data model) understood by the management coordinator component.

The system can further include a secure data store that stores critical data in a secure environment, for example, the well-protected environment discussed above. The system can also include a notification listener component that serves as an endpoint that receives inbound traffic from provider(s).

The notification listener component includes logic to dispatch information (e.g., calls) from provider(s) to a particular provider plugin module of the management coordinator component.

The system can also include an event broadcaster component which communicates notifications (e.g., push notifications) related to a digitized card from the system to user device(s). For example, the notifications can include status event(s) such as digital card is activated, digital card is deactivated, etc.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Figure 1:
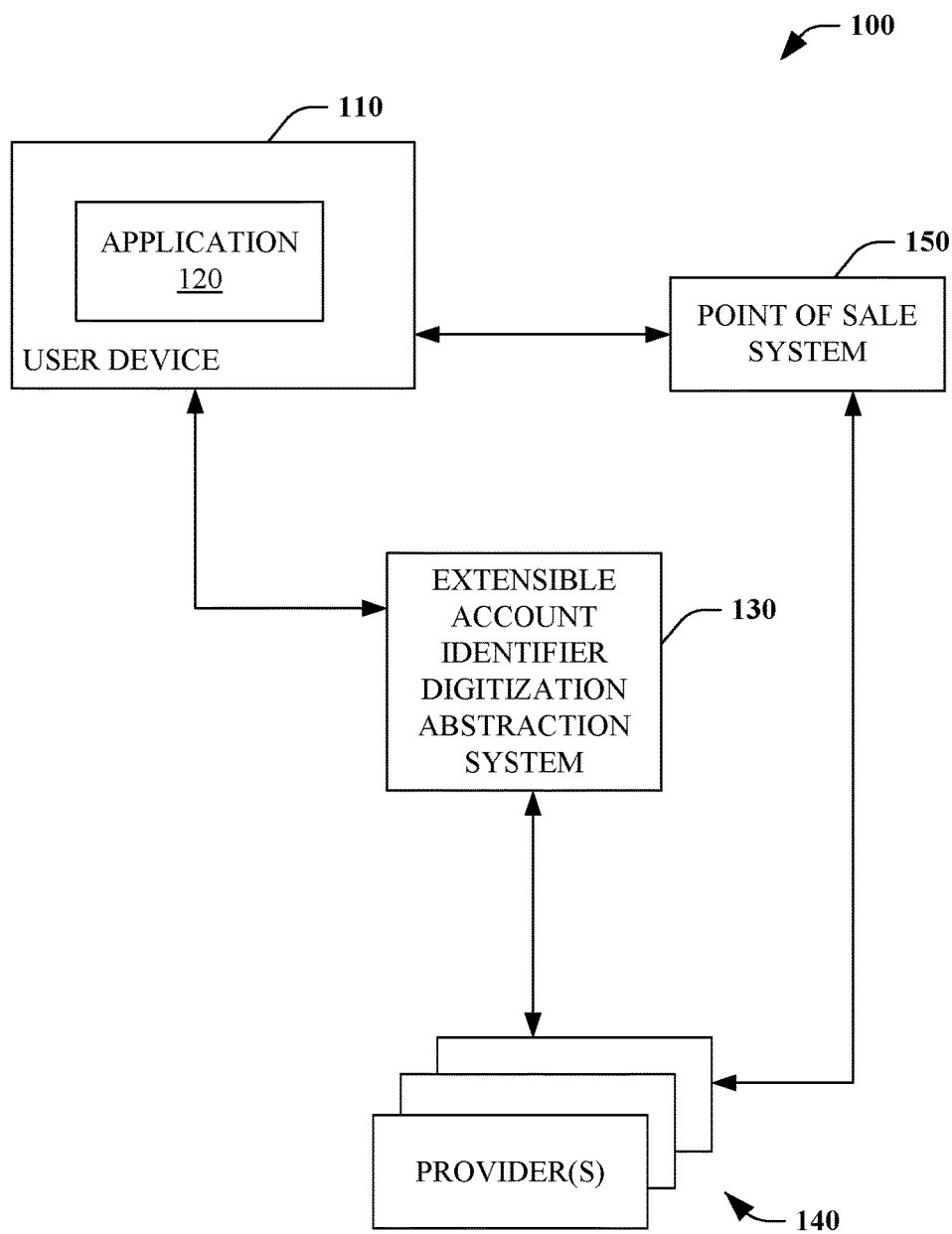
FIG. 1 is a functional block diagram that illustrates a system facilitating a digital transaction.

Various technologies pertaining to an extensible account identifier digitization abstraction system are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects. Further, it is to be understood that functionality that is described as being carried out by certain system components may be performed by multiple components. Similarly, for instance, a component may be configured to perform functionality that is described as being carried out by multiple components.

The subject disclosure supports various products and processes that perform, or are configured to perform, various actions regarding an extensible account identifier digitization abstraction system. What follows are one or more exemplary systems and methods.

Aspects of the subject disclosure pertain to the technical problem of integrating provider(s) (e.g., credit card provider(s), debit card provider(s), etc.) into a digitization system without requiring changes to a client application on a user device (e.g., smart phone). The technical features associated with addressing this problem involve providing an extensible account identifier abstraction system storing data according to a unified data model, the system accessible to the user device via unified interface(s). The extensible abstraction system includes one or more plugin modules/provider relay plug(s) that convert call(s) to the unified interface(s) and data stored according to the unified data model into provider-specific call(s) with data formatted according to a provider-specific schema. Accordingly, aspects of these technical features exhibit technical effects of integrating additional provider(s) into a digitization system without requiring changes to a client application on a user device.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

As used herein, the terms "component" and "system," as well as various forms thereof (e.g., components, systems, sub-systems, etc.) are intended to refer to a computer-related entity, either hardware, a combination of hardware and software, software, or software in execution. For example, a component may be, but is not limited to being, a process running on a processor, a processor, an object, an instance, an executable, a thread of execution, a program, and/or a computer. By way of illustration, both an application running on a computer and the computer can be a component. One or more components may reside within a process and/or thread of execution and a component may be localized on one computer and/or distributed between two or more computers. Further, as used herein, the term "exemplary" is intended to mean serving as an illustration or example of something, and is not intended to indicate a preference.

Further, an "account identifier" uniquely identifies a user to provider. For example, the account identifier can be a credit card number, debit card number, chip-card identifier, reward card identifier and the like. While "credit card" or "card" transactions are discussed in the subject disclosure, those skilled in the art will recognize that the subject disclosure is not limited to these examples and that the subject disclosure can be utilized with any suitable account identifier.

Referring to FIG. 1, a system facilitating a digital transaction 100 is illustrated. The system 100 facilitates transaction(s) amongst a user device 110 (e.g., smart phone) using a client application 120 (e.g., electronic wallet), an extensible account identifier digitization abstraction system 130, a provider 140 and a point of sale system 150. The system 100 can facilitate management operation(s) (e.g., enroll, cancel, query, etc.) and transaction-related operation(s) (e.g., provision card profile, provision new transaction credentials, etc.).

In one example, the extensible account identifier digitization abstraction system 130 and the user device 110 communicate via a protocol for secure communications over the Internet such as Hypertext Transfer Protocol Secure (HTTPS), HTTP over Transport Layer Security (TLS), HTTP over Secure Sockets Layer (SSL) and the like. In one example, during a card transaction, the user device 110 and the point of sale system 150 communicate using near field communications ("NFC") (e.g., "tap to pay") in which the user device 110 and the point of sale system 150 are within a specified proximity of one another.

The extensible account identifier digitization abstraction system 130 exposes unified interface(s) to the user device 110 and further stores data according to a unified data model. By exposing unified interface(s) to the user device 110, as additional provider(s) are added to the extensible account identifier digitization abstraction system, in one example, programming of the application 120 and/or the user device 110 are not required. Instead, the extensible account identifier digitization abstraction system, using plugin module(s) and/or provider relay plugin(s), converts call(s) to the unified interface(s) and data stored according to the unified data model into provider-specific call(s) with data formatted according to a provider-specific schema (e.g., contract).

By allowing for additional provider(s) 140 to be added to the system without requiring changes to the client application, user(s) can add additional card(s) to the client application 120 in a familiar manner. User frustration with adding card(s) the application 120 (e.g., electronic wallet) can be minimized. Further, a rate of innovation can be fundamentally increased.

The extensible account identifier digitization abstraction system 130 is extendable by adding additional provider(s) 140 to be added using plugin module(s) and/or provider relay plugin(s). The plugin module(s) and/or the provider relay plugin(s) can be generated, for example, using a plugin factory and/or by offline generation according to a provider-specific contract and/or specification setting forth content, timing and format of communication(s).

Credit card networks (e.g., providers, issuing banks, etc.) provide support for EMV transactions on digital device(s) using a variety of processes. For example, some providers require a direct connection between the provider and the device, while other providers require a proxy service between the device and the provider. Conventionally, in order to fully onboard an additional provider, the integration effort on both the device side and the server side was substantial.

In addition, providers have various different security schemas/algorithms for transfer EMV profiles/data to the device. Conventionally, supporting the various different security/algorithms would require substantial changes at the device.

Figure 2:
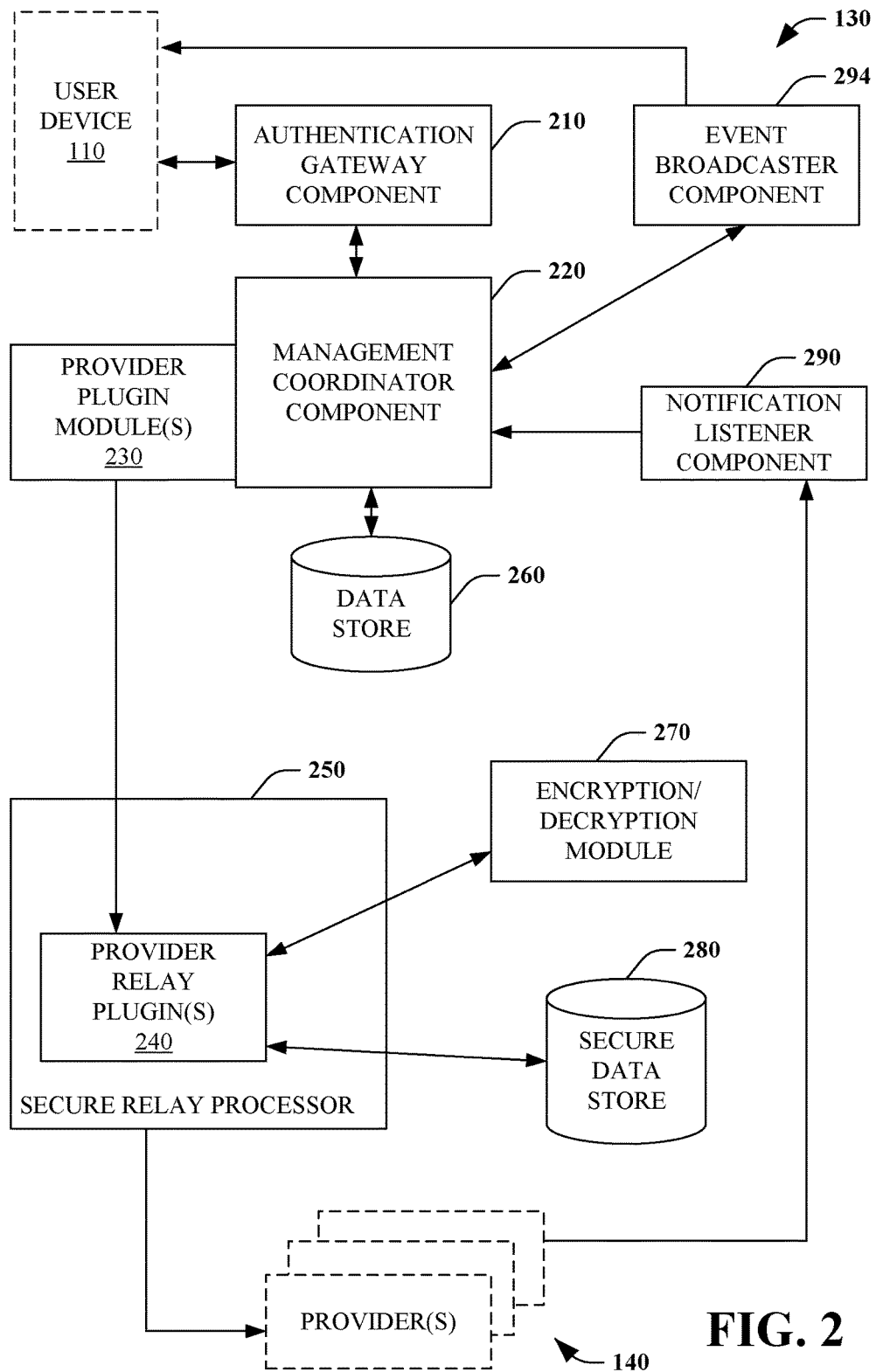
FIG. 2 is a functional block diagram of an exemplary extensible account identifier digitization abstraction system.

Turning to FIG. 2, the extensible account identifier digitization abstraction system 130 comprises provider-agnostic components which provide common functionality shared across different providers 140. Provider-specific logic is encapsulated into plugins which expose the provider-specific logic to other components of the system 130, for example, via unified interface(s), as discussed below.

The extensible account identifier digitization abstraction system 130 includes an authentication gateway component 210 that authenticates the user device 110. The authentication gateway component 210 can isolate external network traffic from other components of the system 130. The authentication gateway component 210 can serve as a proxy or interface between the user device 110 and a management coordinator component 220.

For example, the authentication gateway component 210 can be accessible to the user device 110 via a protocol for secure communications over the Internet. In one example, once authenticated, the authentication gateway component 210 can expose one or more application programming interface(s) (APIs) of the management coordinator component 220 which are used by the user device 110 to communicate with the system 130.

In order to utilize the system 130, a particular user device 110 uses a unique token which authenticates the particular user device 110 to the authentication gateway component 210. The unique token is issued on a per user device 110 (e.g., smart phone) basis. In one example, during enrollment of the user device 110, the unique token is issued based upon information received from the user device 110 (e.g., a hardware identifier) and information obtained from a user of the user device 110. In one example, enrollment of the user device 110 can be a multi-factor process involving emailing a code and/or sending an SMS text of a code which is entered via the application 120 executing on the user device 110.

Once the particular user device 110 has been enrolled, an account identifier (e.g., card) of a user of the user device 110 can be enrolled in the system 130. Enrollment of the account identifier (e.g., card) along can be a multi-factored process and can vary based upon requirement(s) of a particular provider 140. Upon successful enrollment of the account identifier (e.g., card), information regarding the account identifier (e.g., card) is stored in the user device 110 (e.g., tokenized data) and a data store 260.

The management coordinator component 220 utilizes a plugin module 230 associated with the particular provider 140. The plugin module 230 communicates with the particular provider 140 via a provider relay plugin 240 of a secure relay processor 250.

The management coordinator component 220 exposes unified interface(s) to the device 110 and a common framework/runtime to the provider 140 via the plugin module 230. The management coordinator component 220 can utilize a unified data model to store digitized card data in a data store 260. For example, the stored digitized card data can include card metadata, owner device information, an EMV card profile, transaction credentials and the like. In one example, the data store 260 does not include critical data such as a credit card number. The management coordinator component 220 can manage persistence of the digitized card in the data store 260, for example, without allowing an underlying provider 140 to understand the persistence details.

The management coordinator component 220 can expose interface(s) (e.g., APIs) for use by the device 110 and manage state of a digitized card. The management coordinator component 220 can drive a digitization flow from a first state to a second state, for example, from a pending state to a deactivate state.

The plugin module 230 provides functionality to transfer information between the unified interface exposed by the management coordinator 220 and the provider 140. The plugin module 230 can implement a set of operation interface(s), for example, to convert a unified interface call to a call to the provider 140 to facilitate a specific digitization request from the device 110. The plugin module 230 contains the business knowledge to connect the system 130 to the provider 140 and includes the knowledge of converting information received from the provider 140 to the unified data model.

The secure relay processor 250 processes secure data such as credit card information including encryption and decryption. The secure relay processor 250 can include one or more provider relay plugin(s) 240 which each facilitate secure processing based, for example, on a contract (e.g., specification) of a particular provider 140.

In one example, the secure relay process 250 and the one or more provider relay plugin(s) 240 operate in a well-protected environment to prevent secure data from being leaked and/or being the subject of attack. In one example, each plugin module 230 corresponds to a particular provider relay plugin 240 with the particular provider relay plugin

240 providing a secure implementation of encryption and/or decryption as part of the provider contract.

The system 130 can include an encryption/decryption module 270 utilized by provider relay plugin(s) 240. The encryption/decryption module 270 can operate in a well-protected environment, as noted above. In one example, the encryption/decryption module 270 comprises a hardware security module (HSM) which protects encryption/decryption keys and performs encryption/decryption algorithm(s).

Thus, in one example, the plugin module 230 converts unified interface call(s) to provider-specific request(s), handles provider-specific notification(s)/response(s), converts provider-specific concept(s) to unified interface call(s). The provider relay plugin 240 handles provider-specific encryption/decryption requirement(s) and converts them into a unified security schema (e.g., based on the unified data model) understood by the management coordinator component 220.

The system 130 can further include a secure data store 280 that stores critical data in a secure environment, for example, the well-protected environment discussed above. For security purposes, the secure data store 280 is accessible only by component within the secure environment (e.g., well-protected environment), such as the secure relay process 250, the provider relay plugin(s) 240 and/or the encryption module 270.

The system 130 can also include a notification listener component 290 that serves as an endpoint that receives inbound traffic from provider(s) 140. The notification listener component 290 includes logic to dispatch information (e.g., calls) from provider(s) 140 to a particular provider plugin module 230 of the management coordinator component 220.

The system 130 also includes an event broadcaster component 294 which communicates notifications (e.g., push notifications) related to a digitized card from the system 130 to device(s) 110. For example, the notifications can include status event(s) such as digital card is activated, digital card is deactivated, etc.

The system 130 employs a provider plugin model in which the digitized card information is abstracted into a unified data contract and set of behavior(s) (e.g., unified interface(s) and/or unified data model). The unified data contract and set of behavior(s) are converted into provider-specific information (e.g., parameterized call(s)) by a specific provider plug-in module 230 and/or a specific provider relay plugin 240.

The unified data contract can be used to represent the digitized card data within the system 130. In one example, the unified data contract can comprise card metadata which can include, for example, an expiry data of the card, card image(s), card term(s) and condition(s), card issuer bank information to describe the metadata of the digitized card. The unified data contract can further include owner device information, for example, a device name, device type, device operating system version, and the like. The unified data contract can further include an EMV card profile including, for example, EMV data tag(s) which are data required by the device 110 for emulating a chip-card. The unified data contract can further include transaction credentials which are limited use credential issued by provider(s) 140 for generating a cryptogram during transaction time.

By uniformly representing the digitized card within the system using the unified data contract, the device(s) 110 are not required to understand data schemas for required for different provider(s) 140. Instead, data stored in the device 110 can be stored based on the unified data contract. The system 130 can convert the digitized card data into a provider-specific schema using the specific provider plug-in module 230 and/or a specific provider relay plugin 240.

In one example, a life cycle of a digitized card can be supported in management operations by transaction-related operations. The management operations can include, for example, enroll, cancel, query, etc. The transaction-related operations can include, for example, provision a card profile, provision new transaction credentials. Example operations, category ("M" for management and "T" for transaction-related, description and interface examples are set forth in Table 1:

TABLE 1

| Operation | Category | Description | Interface examples |
|---|---|---|---|
| Enroll Digitized Card | M | Accepts a set of data to initiate a digitization process | Add( ) |
| Resume Digitized Card Enrollment | M | During the digitization process, collecting data from device to continue a flow. It can take several steps to finish which can include:<br>1. Accept terms and conditions<br>2. Providing card validation value (CVV)<br>3. Finish issuer's user identification challenge | Resume( ) |
| Cancel Digitized Card Enrollment | M | Cancel/remove the digitized card | Remove( ) |
| Processing Provider Notification | M | Acknowledged on provider's notification which may be sourced from issuer such as suspending/cancel request | HandleNotification( ) |

TABLE 1-continued

| Operation | Category | Description | Interface examples |
|---|---|---|---|
| Handle Unknown State | M | This operation can be triggered when the card gets set into an unknown/error state. It will try to query the provider and try its best to revert the card back to the correct state, if operation continues to fail, the card should be disposed of properly. | HandleUnknownState( ) |
| Query Digitized Card Metadata | M | Get the latest metadata of the digitized card | Get( ) |
| Provision Card Profile | T | Provision the EMV Card Profiles to a device | ProvisionCardProfile( ) |
| Provision Transaction Credentials | T | Provision the Limited used transaction credential to a device | ProvisionTrasactionCredential( ) |

In this example, these operations are common for the digitized card(s) which get extracted by the system 130. The specific provider plug-in module 230 and/or the specific provider relay plugin 240 convert these common operation(s) and card data represented in the unified data contract into provider-specific operation(s) and data formatted to the provider-specific requirement(s).

In one example, the management coordinator component 220 is responsible for state transition and digitized process/card state management logic, data persistence details for the digitized model and notification of digitization card event(s).

Figure 3:
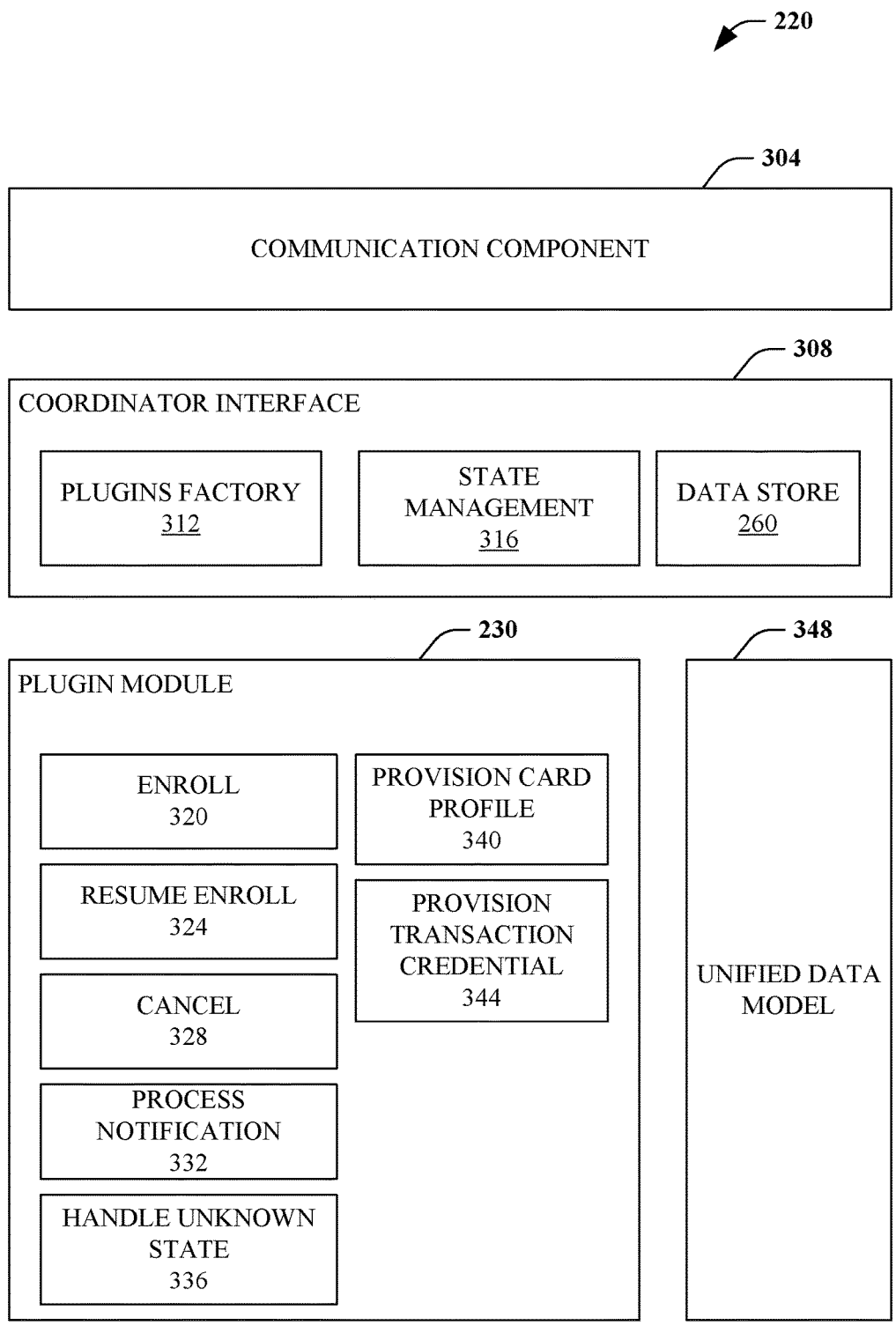
FIG. 3 is a functional block diagram of an exemplary management coordinator component.

Turning next to FIG. 3, a management coordinator component 220 is illustrated. As noted above, the management coordinator component 220 coordinates communication between the user device 110 (through the authentication gateway component 210) and a particular provider 140. The management coordinator component 300 thus acts as the runtime interface to the provider plugin 230 for the user device 110. As such, the management coordinator component 220 encapsulates common logic and provides a unified abstraction to the user device 110. In one example, the management coordinator component 220 encompasses business orchestration details and allow the provider plugin module 230 to be stateless.

In one example, the management coordinator component 220 can provide functionality including card state transition, error compensation, emitting status change event, data persistence, and/or reverse lookup.

The management coordinator component 220 includes a communication component 304 that facilitates communication between the device 110 (e.g., via the authentication component 210 and/or event broadcaster 294) and the management coordinator component 220. The management coordinator component 220 further includes a coordinator interface 308 comprising a plugin factory 312, a statement management component 316 and the data store 260 (e.g., a persistent data store).

The coordinator interface 308 can coordinate instantiation of provider plugin modules 230. In one example, the provider plugin modules 230 are generated by the plugin factory 312 based on a contract (e.g., specification) of a particular provider 140 and the unified data model. The coordinator interface 308 can further manage management state of transaction(s) using the state management component 316.

The provider plugin modules 230 can communicate between the coordinator interface 308 and a particular provider 140. In one example, the provider plugin module 230 can facilitate management operation(s) including enroll, resume enroll, cancel, process notifications and/or handle unknown state, as discussed previously. In one example, the provider plugin module 230 can facilitate transaction operation(s) including provision card profile and/or provision transaction credential, as discussed above with respect to Table 1. These operations can include, for example, enroll 320, resume enroll 324, cancel 328, process notification 332, handle unknown state 336, provision card profile 340 and/or provision transaction credential 344. Further, as discussed above, management coordinator component 220 can utilize a unified data model.

Figure 4:
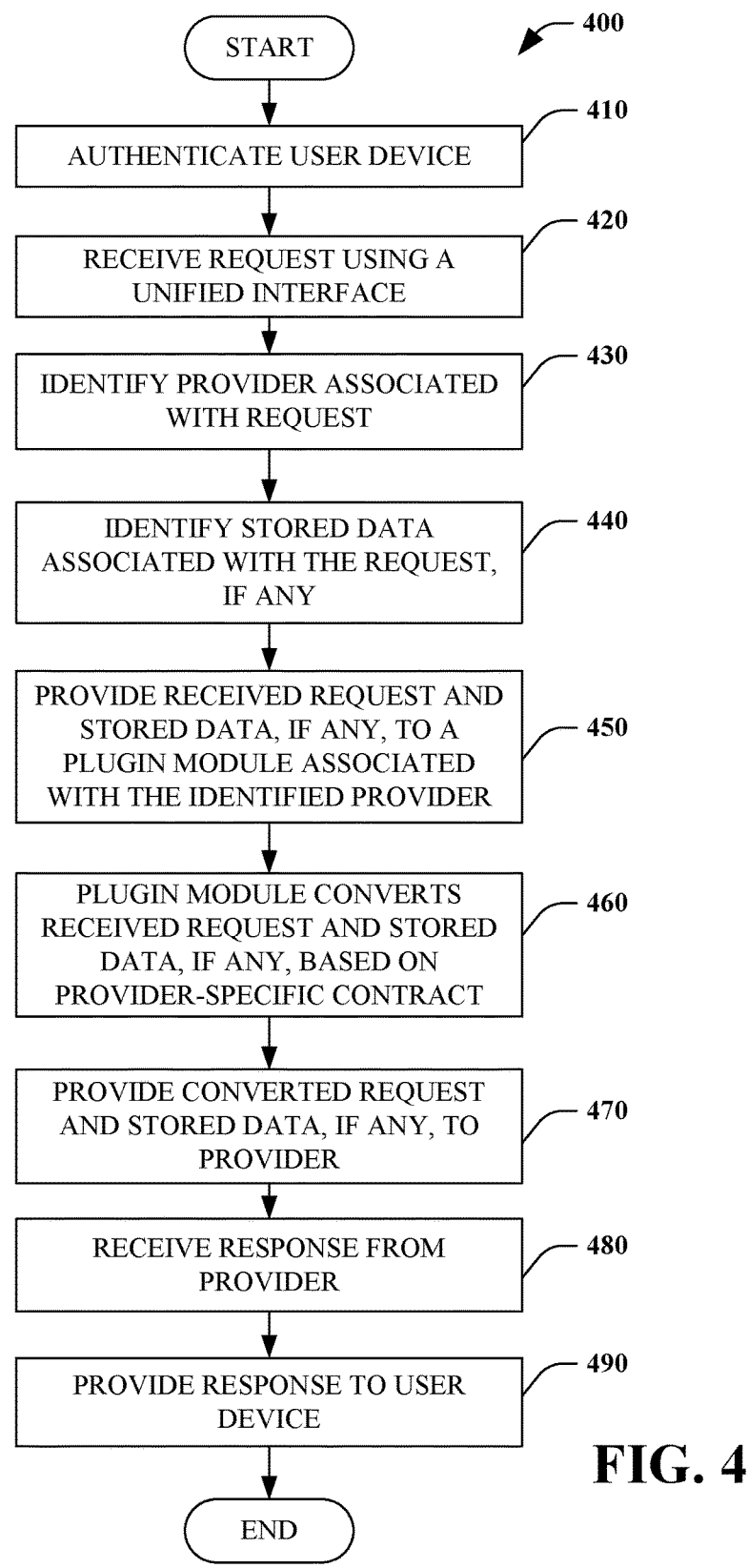
FIG. 4 illustrates an exemplary methodology of utilizing an extensible account identifier abstraction system to facilitate an operation.
Figure 5:
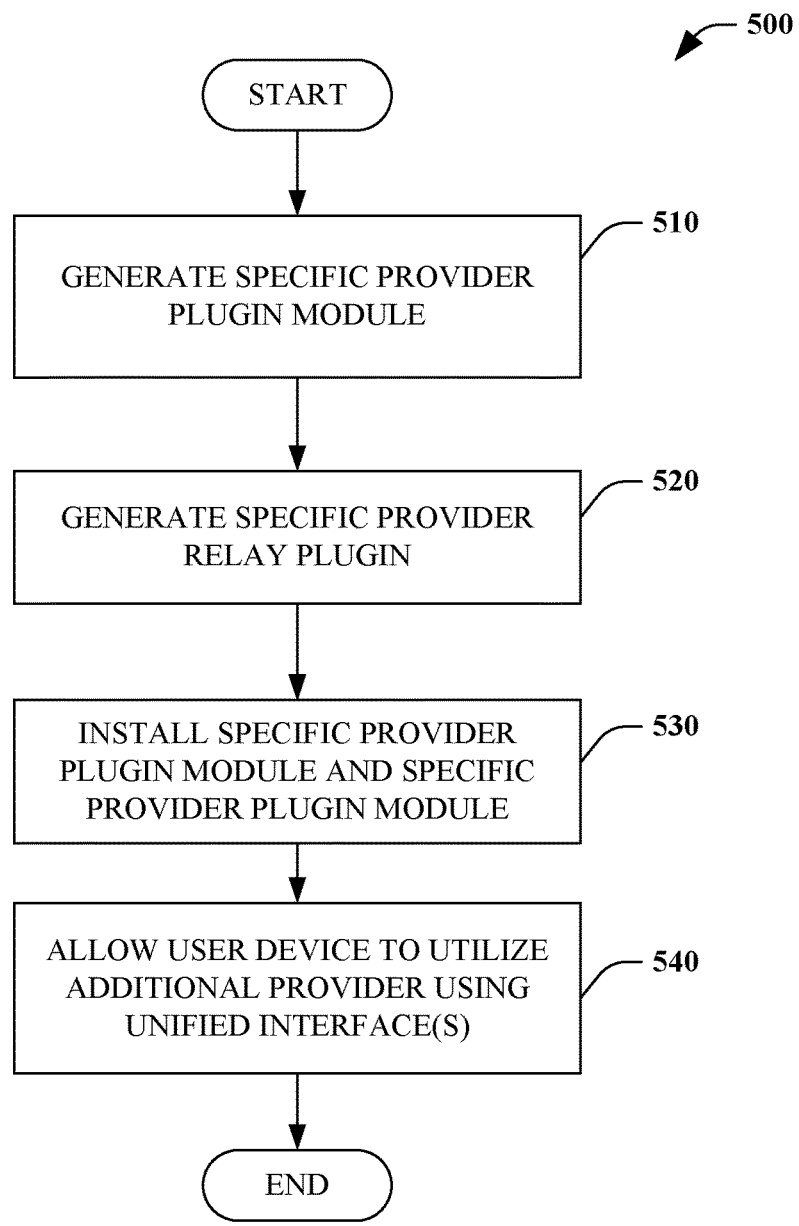
FIG. 5 illustrates an exemplary methodology of extending an extensible account identifier abstraction system to facilitate an additional provider.

FIGS. 4 and 5 illustrate exemplary methodologies relating to an extensible account identifier digitization abstraction system. While the methodologies are shown and described as being a series of acts that are performed in a sequence, it is to be understood and appreciated that the methodologies are not limited by the order of the sequence. For example, some acts can occur in a different order than what is described herein. In addition, an act can occur concurrently with another act. Further, in some instances, not all acts may be required to implement a methodology described herein.

Moreover, the acts described herein may be computer-executable instructions that can be implemented by one or more processors and/or stored on a computer-readable medium or media. The computer-executable instructions can include a routine, a sub-routine, programs, a thread of execution, and/or the like. Still further, results of acts of the methodologies can be stored in a computer-readable medium, displayed on a display device, and/or the like.

Referring to FIG. 4, an exemplary methodology 400 of utilizing an extensible account identifier abstraction system to facilitate an operation is illustrated. The operation can include, for example, a management operation and/or a transaction-related operation.

At 410, a user device is authenticated. For example, a particular user device can use a unique token which authenticates the particular user device. In one example, the unique token can be issued based upon information received from the user device and information obtained from a user of the user device.

At 420, a request is received using a unified interface. For example, the request can be received via one or more of a plurality of APIs of a management coordinator component 220. At 430, a provider associated with the request is identified.

At 440, data associated with the request, if any, is identified. For example, the data can be stored, in a data store 260, based on a unified data model. At 450, the received request and stored data, if any, are provided to a plugin module associated with the identified provider (e.g., plugin module 230).

At 460, the plugin module converts the received request and stored data, if any, based on a provider-specific contract. At 470, the converted request and stored data, if any, are provided to the provider. For example, the provider plugin module 230 can provide the converted requested and stored data, if any, to the provider relay plugin 240 which securely communicates with the provider 140.

At 480, a response to the request is received from the provider. For example, the notification listener component 290 can receive the response from the provider 140. At 490, a response is provided to the user device. For example, an event broadcaster component 294 can provide the response to the user device 110.

Next, turning to FIG. 5, an exemplary methodology 500 of extending an extensible account identifier abstraction system to facilitate an additional provider is illustrated. At 510, a specific provider plugin module is generated. The specific provider plugin module can be generated based upon a contract or specific associated with the additional provider. For example, the specific provider plugin module can convert unified interface call(s) to provider-specific call(s). Further, the specific provider plugin module can convert data stored in the unified data model into data formatted according to a provider-specific schema.

At 520, a specific provider relay plugin is generated. The specific provider relay plugin can operate in a well-protected environment and coordinate communication with the additional provider with the specific provider plugin module.

At 530, the specific provider plugin module and specific provider relay plugin are installed. At 540, a user device is allowed to utilize the additional provider using unified interface(s).

Figure 6:
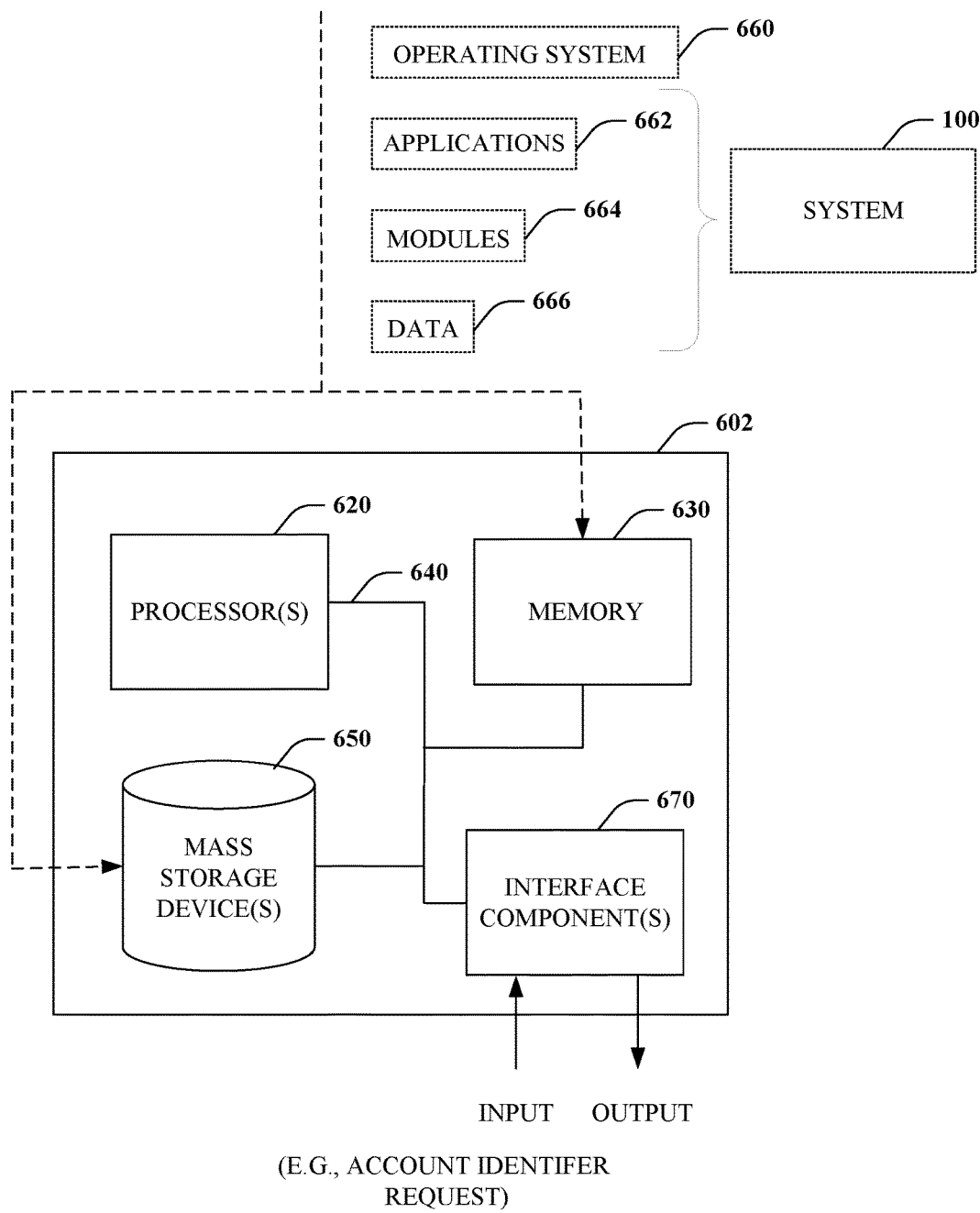
FIG. 6 is a functional block diagram that illustrates an exemplary computing system.

With reference to FIG. 6, illustrated is an example general-purpose computer or computing device 602 (e.g., desktop, laptop, tablet, watch, server, hand-held, programmable consumer or industrial electronics, set-top box, game system, compute node, etc.). For instance, the computing device 602 may be used in an extensible account identifier digitization abstraction system.

The computer 602 includes one or more processor(s) 620, memory 630, system bus 640, mass storage device(s) 650, and one or more interface components 670. The system bus 640 communicatively couples at least the above system constituents. However, it is to be appreciated that in its simplest form the computer 602 can include one or more processors 620 coupled to memory 630 that execute various computer executable actions, instructions, and or components stored in memory 630. The instructions may be, for instance, instructions for implementing functionality described as being carried out by one or more components discussed above or instructions for implementing one or more of the methods described above.

The processor(s) 620 can be implemented with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. The processor(s) 620 may also be implemented as a combination of computing devices, for example a combination of a DSP and a microprocessor, a plurality of microprocessors, multi-core processors, one or more microprocessors in conjunction with a DSP core, or any other such configuration. In one embodiment, the processor(s) 620 can be a graphics processor.

The computer 602 can include or otherwise interact with a variety of computer-readable media to facilitate control of the computer 602 to implement one or more aspects of the claimed subject matter. The computer-readable media can be any available media that can be accessed by the computer 602 and includes volatile and nonvolatile media, and removable and non-removable media. Computer-readable media can comprise two distinct and mutually exclusive types, namely computer storage media and communication media.

Computer storage media includes volatile and nonvolatile, removable and non-removable media implemented in any method or technology for storage of information such as computer-readable instructions, data structures, program modules, or other data. Computer storage media includes storage devices such as memory devices (e.g., random access memory (RAM), read-only memory (ROM), electrically erasable programmable read-only memory (EEPROM), etc.), magnetic storage devices (e.g., hard disk, floppy disk, cassettes, tape, etc.), optical disks (e.g., compact disk (CD), digital versatile disk (DVD), etc.), and solid state devices (e.g., solid state drive (SSD), flash memory drive (e.g., card, stick, key drive) etc.), or any other like mediums that store, as opposed to transmit or communicate, the desired information accessible by the computer 602. Accordingly, computer storage media excludes modulated data signals as well as that described with respect to communication media.

Communication media embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media.

Memory 630 and mass storage device(s) 650 are examples of computer-readable storage media. Depending on the exact configuration and type of computing device, memory 630 may be volatile (e.g., RAM), non-volatile (e.g., ROM, flash memory, etc.) or some combination of the two. By way of example, the basic input/output system (BIOS), including basic routines to transfer information between elements within the computer 602, such as during start-up, can be stored in nonvolatile memory, while volatile memory can act as external cache memory to facilitate processing by the processor(s) 620, among other things.

Mass storage device(s) 650 includes removable/non-removable, volatile/non-volatile computer storage media for storage of large amounts of data relative to the memory 630. For example, mass storage device(s) 650 includes, but is not limited to, one or more devices such as a magnetic or optical disk drive, floppy disk drive, flash memory, solid-state drive, or memory stick.

Memory 630 and mass storage device(s) 650 can include, or have stored therein, operating system 660, one or more applications 662, one or more program modules 664, and data 666. The operating system 660 acts to control and allocate resources of the computer 602. Applications 662 include one or both of system and application software and can exploit management of resources by the operating system 660 through program modules 664 and data 666 stored in memory 630 and/or mass storage device (s) 650 to perform one or more actions. Accordingly, applications 662 can turn a general-purpose computer 602 into a specialized machine in accordance with the logic provided thereby. In one example, application 662 includes key service component 160.

All or portions of the claimed subject matter can be implemented using standard programming and/or engineering techniques to produce software, firmware, hardware, or any combination thereof to control a computer to realize the disclosed functionality. By way of example and not limitation, system 100 or portions thereof, can be, or form part, of an application 662, and include one or more modules 664 and data 666 stored in memory and/or mass storage device(s) 650 whose functionality can be realized when executed by one or more processor(s) 620.

In accordance with one particular embodiment, the processor(s) 620 can correspond to a system on a chip (SOC) or like architecture including, or in other words integrating, both hardware and software on a single integrated circuit substrate. Here, the processor(s) 620 can include one or more processors as well as memory at least similar to processor(s) 620 and memory 630, among other things. Conventional processors include a minimal amount of hardware and software and rely extensively on external hardware and software. By contrast, an SOC implementation of processor is more powerful, as it embeds hardware and software therein that enable particular functionality with minimal or no reliance on external hardware and software. For example, the system 100 and/or associated functionality can be embedded within hardware in a SOC architecture.

The computer 602 also includes one or more interface components 670 that are communicatively coupled to the system bus 640 and facilitate interaction with the computer 602. By way of example, the interface component 670 can be a port (e.g., serial, parallel, PCMCIA, USB, FireWire, etc.) or an interface card (e.g., sound, video, etc.) or the like. In one example implementation, the interface component 670 can be embodied as a user input/output interface to enable a user to enter commands and information into the computer 602, for instance by way of one or more gestures or voice input, through one or more input devices (e.g., pointing device such as a mouse, trackball, stylus, touch pad, keyboard, microphone, joystick, game pad, satellite dish, scanner, camera, other computer, etc.). In another example implementation, the interface component 670 can be embodied as an output peripheral interface to supply output to displays (e.g., LCD, LED, plasma, etc.), speakers, printers, and/or other computers, among other things. Still further yet, the interface component 670 can be embodied as a network interface to enable communication with other computing devices (not shown), such as over a wired or wireless communications link.

What has been described above includes examples of aspects of the claimed subject matter. It is, of course, not possible to describe every conceivable combination of components or methodologies for purposes of describing the claimed subject matter, but one of ordinary skill in the art may recognize that many further combinations and permutations of the disclosed subject matter are possible. Accordingly, the disclosed subject matter is intended to embrace all such alterations, modifications, and variations that fall within the spirit and scope of the appended claims. Furthermore, to the extent that the term "includes" is used in either the details description or the claims, such term is intended to be inclusive in a manner similar to the term "comprising" as "comprising" is interpreted when employed as a transitional word in a claim.

What is claimed is:

1. An extensible account identifier digitization abstraction system, comprising:
   a computer comprising a processor and a memory, the memory comprising:
   a management coordinator component configured to receive a request from a user device, identify a provider associated with the request, provide the request to a provider plugin module associated with the identified provider, wherein the request is associated with an integrated chip card, the management coordinator component further configured to emulate the integrated chip card based on a card profile stored in a data store;
   the provider plugin module configured to convert the received request based on a provider-specific contract, provide the converted request to the identified provider using a provider relay plugin; and
   the provider relay plugin configured to securely communicate with the identified provider.

2. The system of claim 1, further comprising an authentication component configured to authenticate the user device to the extensible account identifier digitization abstraction system.

3. The system of claim 2, wherein authentication of the user device is based on a token stored on the user device.

4. The system of claim 1, wherein the request is received via a unified interface.

5. The system of claim 4, wherein the unified interface comprises an application programming interface.

6. The system of claim 1, the provider plugin module further configured to convert data stored in a unified data model into a data schema utilized by the identified provider.

7. The system of claim 1, further comprising a secure data store storing limited use transaction credentials issued by the identified provider for generating a cryptogram during a transaction time, the limited use credentials utilized by the provider relay plugin during secure communication with the identified provider.

8. The system of claim 1, wherein the request comprises a management operation.

9. The system of claim 8, wherein the management operation comprises at least one of enrolling a digitized card, resuming digitized card enrollment, canceling a digitized card enrollment, processing a provider notification, handling an unknown state or querying digitized card metadata.

10. The system of claim 1, wherein the request comprises a transaction-related operation.

11. The system of claim 10, wherein the transaction-related operation comprises at least one of provision of a card profile or provision transaction credentials.

12. A method of utilizing an extensible account identifier abstraction system to facilitate an operation, comprising:
   receiving a request using a unified interface;
   identifying a provider associated with the request;
   providing the request to a plugin module associated with the identified provider;

identifying stored data associated with the request by the plugin module, converting the stored data into data formatted according to a provider-specific schema;

providing the converted stored data to the identified provider;

by the plugin module, converting the request based on a provider-specific contract; and providing the converted request to the identified provider.

13. The method of claim 12, further comprising:

receiving a response to the converted request from the provider; and providing the response to the user device.

14. The method of claim 12, further comprising:

authenticating the user device using a token that uniquely identifies a user device that sent the request.

15. A computer storage media storing computer-readable instructions that when executed cause a computing device to:

receive a request using a unified interface;

identify a provider associated with the request;

provide the request to a plugin module associated with the identified provider;

identify stored data associated with the request;

by the plugin module, convert the stored data into data formatted according to a provider-specific schema;

provide the converted stored data to the identified provider;

by the plugin module, convert the request based on a provider-specific contract; and provide the converted request to the identified provider.

16. The computer storage media of claim 15, storing further computer-readable instructions that when executed case the computing device to:

receive a response to the converted request from the provider; and provide the response to the user device.

17. The computer storage media of claim 15, storing further computer-readable instructions that when executed case the computing device to:

authenticate the user device using a token that uniquely identifies a user device that sent the request.

* * * * *